E. G. DALTON.
SIFTER.
APPLICATION FILED NOV. 1, 1921.

1,420,412.

Patented June 20, 1922.

WITNESSES

INVENTOR
E. G. DALTON

BY

ATTORNEYS

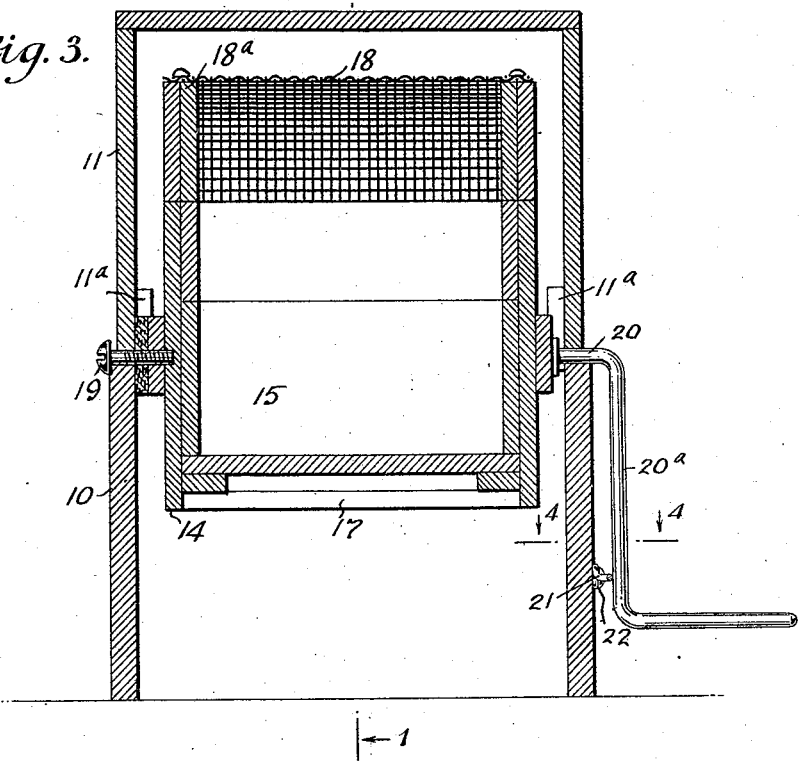
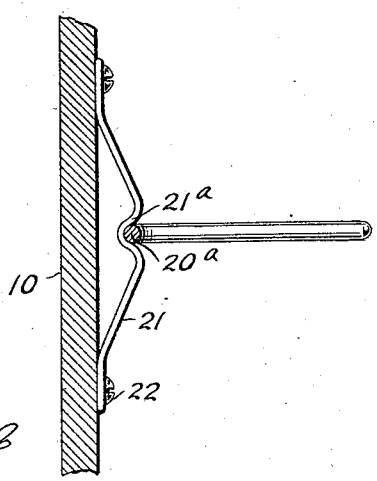

UNITED STATES PATENT OFFICE.

EDMUND GREGORY DALTON, OF PROVIDENCE, RHODE ISLAND.

SIFTER.

1,420,412.  Specification of Letters Patent.  Patented June 20, 1922.

Application filed November 1, 1921. Serial No. 512,048.

*To all whom it may concern:*

Be it known that I, EDMUND G. DALTON, a citizen of the United States, and a resident of Providence, in the county of Providence and State of Rhode Island, have invented a new and Improved Sifter, of which the following is a description.

My invention relates to a sifter and more particularly to a sifter having a vibratable sieve structure adapted to receive a removable pan and enclosed in a dust-proof housing.

The general object of my invention is to provide a sifter of the indicated character improved in various particulars as will clearly appear from the specific description following.

Reference is to be had to the accompanying drawings forming a part of this specification, it being understood that the drawings are merely illustrative of one example of the invention.

Figure 3 is a vertical section at right angles to Figures 1 and 2;

Figure 4 is a detail in horizontal section on the line 4—4, Figure 3.

In carrying out my invention in accordance with the illustrated example, a suitable casing 10 is provided, having a cover 11 and a door 12 hinged at its lower edge as at 13 to swing outwardly, said casing being dust-proof.

Figure 1:
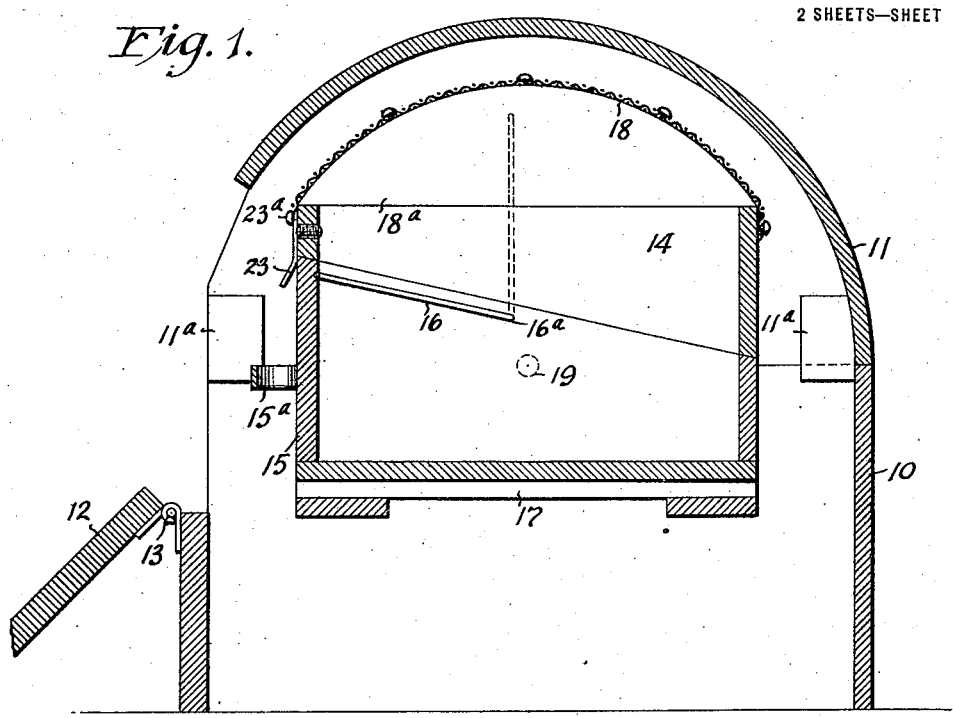
Figure 1 is a vertical section of a sifter embodying my invention as indicated by the line 1—1, Figure 3, said view showing the vibratable sifter structure in known upright position.
Figure 2:
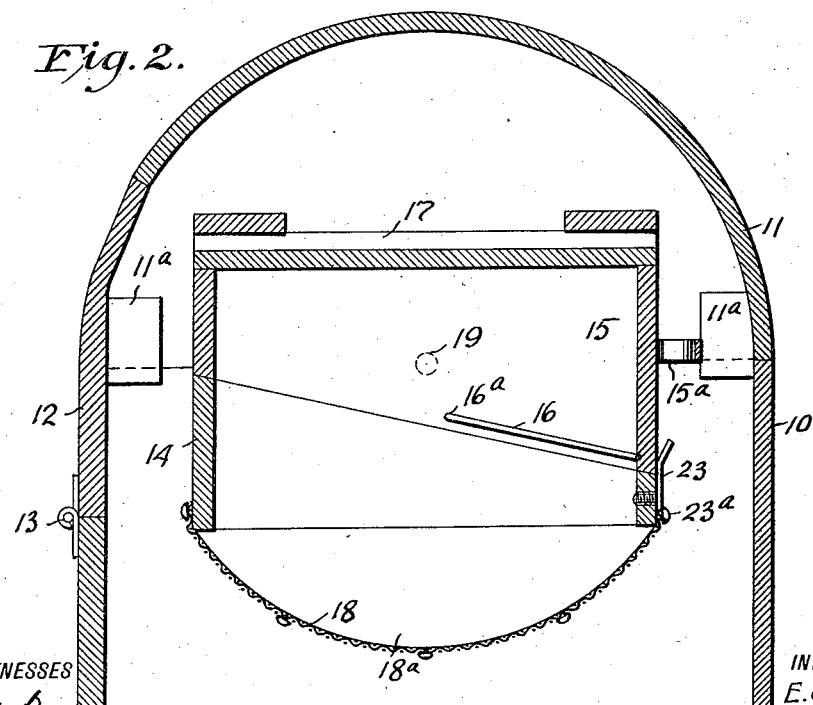
Figure 2 is a view similar to Figure 1 showing the sifter inverted for the sifting operation.
Figure 2:

A sifter structure designated generally by the numeral 14 is provided in the casing 10, the same being generally of box-like form and receiving a removable pan or holder 15, the latter having a suitable handle $15^a$ at the front thereof. A dumping bail 16 is provided on the pan 15 and the sides thereof are pivoted to the pan as at $16^a$ at the interior, so that the bail may be lowered into the plane of the pan 15 and into contact with the front of the pan as in Figures 1 and 2 or raised to the dotted line position shown in Figure 1, it being understood that the bail is only raised when the pan is removed from the sifter structure 14 for dumping the pan.

The bottom 17 of the structure 14 is closed and over the open top thereof is an arched sieve 18 sustained by sides $18^a$ rigid with the sifter section. The sifter structure 14 is rockably mounted in the casing 10 by suitable trunnions, there being shown, for example, a screw 19 constituting the trunnion at one end, the opposite trunnion being formed by the coaxial portion 20 of the crank handle $20^a$.

To hold the crank handle $20^a$ against movement and thereby maintain the sifter structure 14 against turning, I provide a spring catch 21 having a depression $21^a$ at the center to receive the crank handle as clearly shown in Figures 3 and 4. Also, suitable means is provided to hold the pan 15 in the structure 14, there being shown for the purpose a catch 23 pivoted as at $23^a$ to said structure.

It is to be observed that the pan 15 is of less height at the back than at the front of the pan and that the sides slope from the front to the back, the box structure 14 being formed to correspond, there being an opening in the front of the structure 14 below the top edge, of a size to receive the front of the pan in the plane of said front of said structure, and a smaller opening in the back of said structure 14 to receive in the plane of said back, the back of the pan 15. A purpose of thus forming the pan 15 is to permit of the same being inserted in the structure 14 even when completely filled, with the ashes or other material to be sifted, rising above the plane of the sloping side edges of the pan, since the ashes even though above the side edges of the pan will yet not be above the top edge of the front of the pan.

The character $11^a$ indicates retaining members on the cover 11 and projecting below the lower edge thereof to lie at the inner side of the structure 14 and overlap the upper edge of the latter.

I would state in conclusion that while the illustrated example constitutes a practical embodiment of my invention, I do not limit myself strictly to the exact details herein illustrated, since, manifestly, the same can be considerably varied without departure from the spirit of the invention as defined in the appended claims.

Having thus described my invention, I claim:

1. A sifter comprising a casing, a vibratable box-like sifter structure therein, a sieve at the top of said structure, and a pan slidable into or from said structure, said pan sloping toward the back end, the box structure having a corresponding slope.

2. A sifter comprising a casing, a vibratable box-like sifter structure therein, a sieve at the top of said structure, a pan slidable into or from said structure, and a bail pivotally secured at its sides to the sides of the pan at the interior of the latter and swingable to a position within the plane of the pan and into contact with the front of the latter.

3. A sifter comprising a casing, a box-like sifter structure therein, an arched sieve over the open top of said structure, side supports for said sieve rigid with said structure, the front of said structure having an opening below the top edge and the back of said structure having a smaller alined opening; means rockably mounting said structure to permit it to be inverted, a crank handle on said structure extending to the exterior of the casing for vibrating said structure, and a pan slidable into or from said structure through said casing and having the front and back thereof corresponding in size with said openings and the upper edges of the pan sloping between the front and back, the opposed edges presented by said structure between said openings sloping to correspond with the slope of the said pan edges.

EDMUND GREGORY DALTON.